Figure 11:
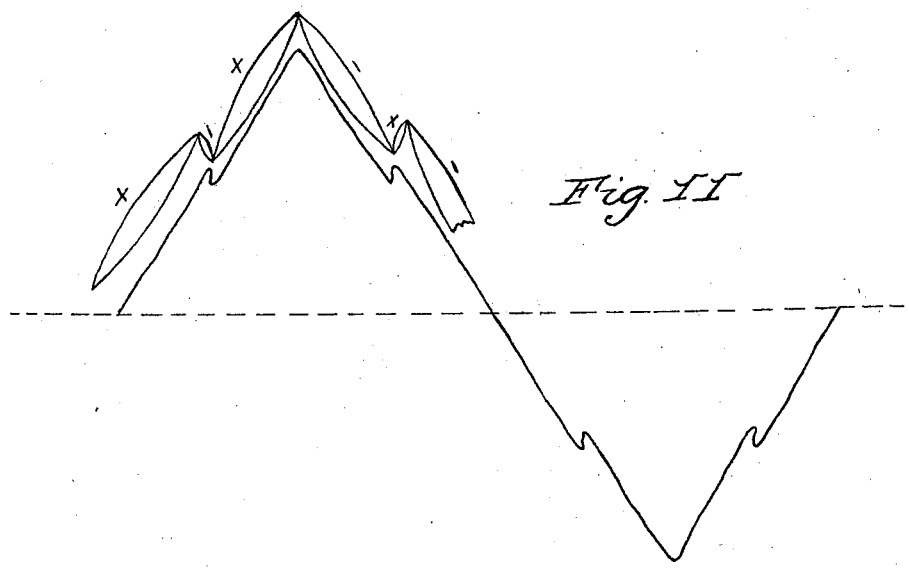

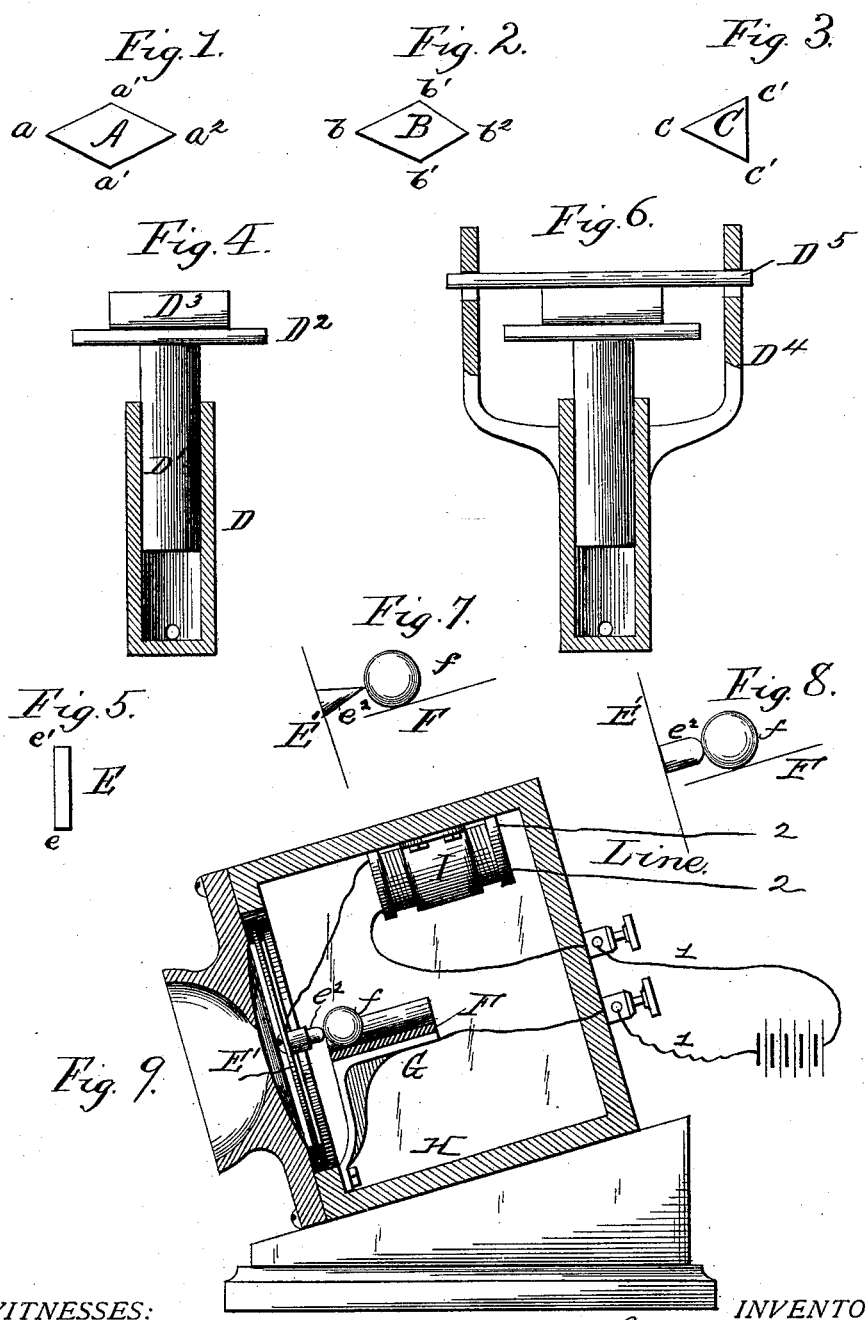

(Model.)

J. W. BONTA.
TELEPHONING.

No. 361,124. Patented Apr. 12, 1887.

2 Sheets—Sheet 2.

Witnesses
F. W. Combs
R. G. Amies

Inventor
James W. Bonta
By his Attorneys
M. F. Halleck
S. J. Van Stavoren

UNITED STATES PATENT OFFICE.

JAMES W. BONTA, OF PHILADELPHIA, PENNSYLVANIA.

TELEPHONING.

SPECIFICATION forming part of Letters Patent No. 361,124, dated April 12, 1887.

Application filed January 27, 1887. Serial No. 225,639. (Model.)

*To all whom it may concern:*

Be it known that I, JAMES W. BONTA, a citizen of the United States, residing at Philadelphia, in the county of Philadelphia and State of Pennsylvania, have invented certain new and useful Improvements in Telephoning, of which the following is a specification.

Heretofore the accepted theory or method of telephoning has been based upon electrical undulations similar in form to the vibrations of the air accompanying the vocal or other sounds to be transmitted—that is, the electrical impulses or undulations begin at zero, gradually increase to a maximum, and then gradually decrease to zero for each vibration of the diaphragm. The vibrations of the air which produce the electrical undulations in the transmitting medium have been compared to or considered analogous with the changes in the density of the air occasioned by simple pendulous vibrations. A single vibration of a pendulum is the distance through which it oscillates from the point at which it begins to descend on one side of the vertical to the point upon the opposite side of the vertical when its motion is arrested by gravity.

The movement of the pendulum from the starting-point is uniformly accelerated until it reaches the vertical, and uniformly retarded by gravity after it leaves the vertical until it comes to the arresting-point.

A in Figure 1 diagrammatically represents the phases of the movement. $a$ is the starting-point, $a'$ $a'$ the vertical, and $a^2$ the arresting-point. Vocal or other sounds acting upon a diaphragm would theoretically have the same effect; but, owing to the fact that the diaphragm is usually secured at its edge, the amplitude of its vibration would become curtailed in its movement between the vertical and the arresting-point, so that the last half of the phase would in fact be less than that in theory.

B in Fig. 2 diagrammatically represents the practical phases of the first movement of the diaphragm. $b$ is the starting-point, $b'$ $b'$ the vertical, and $b^2$ the arresting-point. Telephonic instruments have heretofore been operated upon this principle, and electrical undulations of the current corresponding to the vibrations of the diaphragm have been produced in the circuit in two ways—one by the vibration or motion of bodies capable of inductive action, the instrument for accomplishing it being termed a "magneto-telephone," and the other by alternately increasing and diminishing the resistance of the circuit, the instrument for accomplishing it being termed an "electric-contact telephone or microphone." Several ways of varying the resistance of the current have been suggested; but the one commonly used is that in which a weight or spring is employed to offer resistance to the diaphragm, and thus press together the electrodes located between the diaphragm and weight or spring to increase or decrease the contact between the electrodes. In this form, owing to the spring resisting the action of the diaphragm, the diagrammatic view of the electrical undulation for a single pendulous vibration would vary from that shown in B, and is expressed in C, Fig. 3, $c$ being the starting-point, and $c'$ the resting-point.

I have discovered that vocal and other sounds can be transmitted without the necessity of vibrating or moving a body capable of inductive action in the neighborhood of a conducting-wire, or vibrating the conducting-wire itself in the neighborhood of a body capable of inductive action, or varying the resistance of the circuit, or varying the power of or affecting the battery in any way.

It is a well-settled law that a body simply resting upon another body exerts practically no force upon the body upon which it rests, save that due to its own weight; that if both bodies are moved by a force applied to the lower body the upper one will not practically offer any greater resistance to the movement of both bodies than that imparted by its own weight, and that this resistance is constant, no matter to what extent the bodies may be lifted or moved upwardly within defined practical limits, and this would be the case whether the force applied to the lower body be uniform, gradually accelerated, diminished, or otherwise varied—that is to say, no mattter how the force or power applied to the lower body may vary as the bodies are moved, the contact-pressure between the upper and the lower bodies remains practically constant.

To illustrate: In Fig. 4 is shown a cylinder, D, a piston, D', and a platform, $D^2$, of a hydraulic press, and a body, $D^3$, resting upon the platform. Now, if water be forced into the cylinder D, the piston, platform, and body D³ will be lifted; but the body D³ practically offers no more resistance to being lifted than its own weight, and the contact-pressure between it and the platform is practically always constant. Its movement may, therefore, be diagrammatically represented, as in E, Fig. 5, $e$ being the starting-point, and $e'$ the resting-point. If the piston be moved up and down, the movement of the body resting upon the platform would be diagrammatically represented by a succession of impulses similar to E, Fig. 5, these impulses varying in length to correspond with the extent of the movement. If, however, a spring be placed above the body, as in Fig. 6, (which represents a hydraulic press having standards D⁴ and spring D⁵, loosely held in slots formed in the standards,) an effect similar to that diagrammatically shown at C, Fig. 3, is produced—that is, the contact-pressure between the body and platform is gradually increased as the body is forced against the spring, and gradually decreased as the force is withdrawn. The impulses of these up-and-down movements would be represented by a series of diagrams similar in form to C in Fig. 3, each alternate one, however, being reversed.

It is a well-settled law that two bodies attract each other with a force varying directly as their masses and inversely as the square of their distance. For example, if two electrodes in contact with each other were moved by the voice away from the earth in theory, the attraction between them and the earth would decrease as the square of the distance from the earth increased, and the contact-pressure between the electrodes would theoretically vary accordingly. In practice, however, as the space through which the electrodes would move is so infinitesimal, the variation in contact-pressure between them due to the changes in attraction is practically nothing. Hence, if a rolling body resting upon an inclined plane in contact with another movable body not resting on the inclined plane, but arranged below the rolling body, and having a movement on a line parallel with the inclined plane, is moved by a force pressing against the lower body, the rolling body within confined limits will offer no greater resistance to the movement of the lower body than that given by its own weight, as the friction of the rolling body upon the inclined plane is uniform. In other words, the rolling and movable bodies move as one, no matter how the impelling force or power may be varied, and the contact-pressure between the bodies, therefore, remains constant, and the diagrammatic view of this contact-pressure would be the same as that shown in E, Fig. 5. Now, if this law be utilized in the construction of telephones and the instrument transmitting vocal or other sounds, a method of transmitting vocal or other sounds other than by electrical undulations similar in form to the vibrations of the air accompanying said vocal or other sounds would be produced.

Figs. 7 and 8 are diagrams showing constructions which, if embodied in a telephone-transmitter, would have the conditions necessary for utilizing the law referred to. E' represents a diaphragm placed obliquely to the vertical, and having an electrode, $e^2$; and F, an inclined plane placed at right angles to the diaphragm, and having a rolling electrode, $f$, thereon and in contact with the electrode $e^2$ on the diaphragm. It will be noted that the table and diaphragm are at right angles to each other. Now, if the table were placed horizontally, the diaphragm would be in a vertical line. If a ball-electrode be placed upon the table in contact with electrode $e^2$ and sound-force impinged against the diaphragm, the ball, if heavy enough, would remain stationary and the contact would be continuous; but if the ball were lighter than the force or power acting against the diaphragm it would be driven off and would not return, and the contact would be broken. Such action of the ball would be proof, however, that the force impinging against the diaphragm was greater than the inertia to be overcome. Now tilt the inclined plane and diaphragm to such an angle that the ball will return when thrown or driven off the diaphragm-electrode, and if the device when so arranged should transmit speech and the ball be driven from contact with electrode $e^2$ the conditions necessary to transmit speech without varying the intensity of the current are secured—that is to say, the ball is not subject to the varying forces impelled against the diaphragm, but simply moves to and fro with the oscillations of the latter, and this movement would be diagrammatically expressed, as at E, Fig. 5. The current is not varied, but remains uniform. Now, if the ball separated from the diaphragm at the end of each forward oscillation of the diaphragm and returned to it in time to move with it as it makes the succeeding oscillation or movement, a succession of intermittent or pulsatory currents of uniform volume or intensity of a length equal to the amplitude of the vibration of the diaphragm, or to the phases of its oscillations, is secured for acting upon a receiver at a distant station to reproduce the sounds transmitted.

In my patent dated January 5, 1886, I have described a method of transmitting vocal or other sounds by first varying and then breaking the current. The breaking of the current is caused by the ball leaving the electrode on the diaphragm. The same result (i. e., throwing off the ball) is produced in the constructions shown in Figs. 7 and 8. My invention therefore consists, broadly, of a method of transmitting vocal or other sounds telephonically by intermittent or pulsatory currents of electricity of a uniform volume or intensity, having a duration equal to the amplitude of the vibration of the diaphragm, or of the phases of its oscillations.

In Fig. 9 is shown a form of instrument or transmitter for practicing my invention, and which I have practically used. E' represents the diaphragm, having electrode $e^2 f$, the rolling electrode supported upon a table, F, placed at right angles to the diaphragm, said table being mounted upon a platform, G, suitably secured to the casing H, mounted upon a base, or otherwise suitably arranged to locate the diaphragm in an angular position, as shown. 1 1 represent the battery-circuit, which includes the diaphragm-electrode, rolling electrode $f$, table F, platform G, and primary of an inductorium, I, the secondary of which forms part of the line 2 2.

The operation of the device is as follows: When vocal or other sounds are produced in the neighborhood of the transmitting-instrument, the sound-forces created thereby impinge upon the diaphragm, which moves the electrode $e^2$ obliquely forward in a line parallel with the upper face of the inclined table and propels the ball up the inclined surface of the latter. The impelling-force acting upon the ball is greater than the weight of the ball, which, owing to the fact that the diaphragm is secured at its edges, is propelled beyond the farthest point of movement of the electrode $e^2$, and causes a break in the current of a duration equal to the time the ball is moving away from electrode $e^2$, plus the time the ball comes to a state of rest and plus the time it takes to return down the inclined plane to the electrode $e^2$. The ball rapidly returns down the inclined plane, while the return of the diaphragm is retarded by reason of its being secured at the edge. The ball therefore has time to make contact with electrode $e^2$ in season to receive the next impulse from the diaphragm and pass through the same operation. The volume of each intermittent current or pulsation is uniform from beginning to end, as there is no variation in contact-pressure between the diaphragm and rolling electrodes, owing to the fact that the resistance of the ball is uniform from the time the diaphragm begins to move until it leaves the electrode $e^2$, and the rapidity with which it leaves the electrode $e^2$ makes a clean break at the end of each impulse. The current, diagrammatically represented, would be substantially as in Fig. 10. The flow or duration of the intermittent current would be regulated by the distance the ball is moved up the inclined plane in contact with the electrode $e^2$, or to the length of the phases of the oscillations of the diaphragm.

In practice the current in the primary would be normally closed; but as soon as the diaphragm is subject to the influence of vocal or other sound-forces the current would become intermittent or pulsatory, or the circuit of the instrument is opened and closed, and such action continues so long as the diaphragm is within the range of the sound influences.

Figure 12:
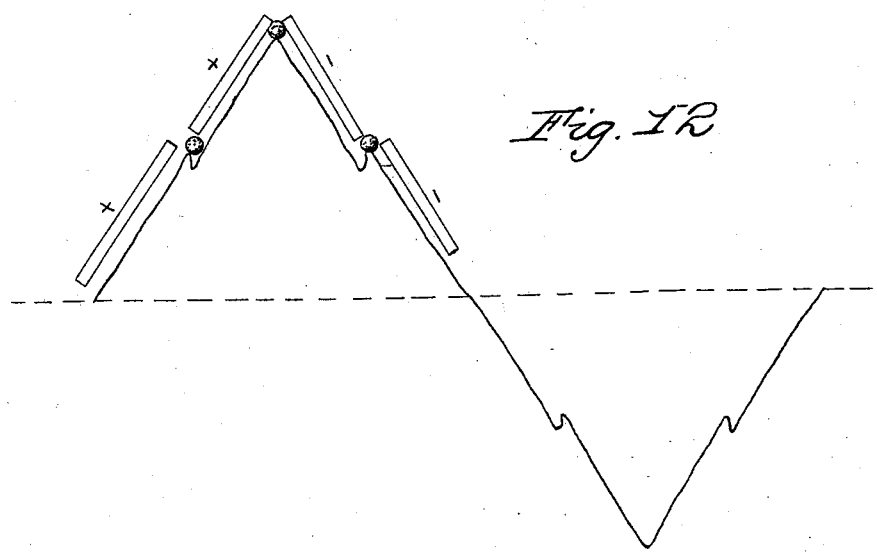

If the graphic representation showing that the diaphragm never acts during its excursions with a constant velocity, and that the variations in the path of its excursions are due to overtones in Fig. 11, when subject to sound-forces, and the accompanying diagrammatic view of the current impulses, as heretofore accepted as correct, be correct, then the difference between the same and my method can be graphically expressed, as in Fig. 12, which not only shows a diagrammatic of the impulses, but also the points—to wit, at the overtones and fundamentals—at which the rolling electrode separates from the diaphragm-electrode to produce the pulsatory or intermittent currents having a duration corresponding to that of the phases of the oscillations of the diaphragm.

The action of the instrument herein described is contradistinguished from those of Reiss, in that the ball-electrode is accompanied by no spring-pressure devices, the reaction of which produces irregular breaks, and hence these are eliminated; and, further, that the ball breaks with the overtones, as well as with the fundamentals, timed and spaced by the action of the voice itself to cause intermittent uniform impulses corresponding in duration with the phases of the fundamentals.

What I claim is—

1. The art or method of transmitting vocal or other sounds telephonically by causing intermittent or pulsatory currents of a uniform volume or intensity, and of durations corresponding to the phases of the oscillations of the diaphragm.

2. The method of transmitting vocal and other sounds telephonically by causing electrical impulses of constant volume and of durations corresponding to the elements of the sound force or waves, substantially as set forth.

3. The method of transmitting vocal or other sounds telephonically by causing electrical impulses which differ in duration with the overtones and fundamentals of the vocal or other sounds, substantially as set forth.

In testimony whereof I affix my signature in presence of two witnesses.

JAMES W. BONTA.

Witnesses:
J. DANIEL EBY,
S. J. VAN STAVOREN.